United States Patent
Luger

(10) Patent No.: US 7,354,202 B1
(45) Date of Patent: Apr. 8, 2008

(54) FIBER OPTIC CABLE CONNECTOR

(75) Inventor: Jerry D. Luger, Cottage Grove, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 106 days.

(21) Appl. No.: 11/330,789

(22) Filed: Jan. 12, 2006

(51) Int. Cl.
*G02B 6/36* (2006.01)

(52) U.S. Cl. ............................. 385/80; 385/77; 385/78; 385/82

(58) Field of Classification Search ................. 385/77, 385/80, 82
See application file for complete search history.

(56) References Cited

U.S. PATENT DOCUMENTS

| | | | |
|---|---|---|---|
| 4,697,870 A | 10/1987 | Richards | |
| 5,375,183 A | 12/1994 | Edwards et al. | |
| 5,422,971 A | 6/1995 | Honjo et al. | |
| 5,619,604 A | 4/1997 | Shiflett et al. | |
| 5,815,619 A | 9/1998 | Bloom | |
| 5,915,055 A | 6/1999 | Bennett et al. | |
| 5,923,803 A * | 7/1999 | Bunin et al. | 385/80 |
| 6,072,932 A | 6/2000 | Bennett et al. | |
| 6,173,090 B1 | 1/2001 | Simon et al. | |
| 6,244,756 B1 | 6/2001 | Bloom | |
| 6,690,867 B2 * | 2/2004 | Melton et al. | 385/114 |
| 6,714,707 B2 | 3/2004 | Rossi et al. | |
| 6,771,861 B2 | 8/2004 | Wagner et al. | |
| 6,873,781 B2 * | 3/2005 | Sumide | 385/137 |
| 2003/0138226 A1 | 7/2003 | Rossi et al. | |
| 2003/0210875 A1 | 11/2003 | Wagner et al. | |

\* cited by examiner

*Primary Examiner*—Frank G. Font
*Assistant Examiner*—Eric Wong
(74) *Attorney, Agent, or Firm*—Oppenheimer Wolff & Donnelly LLP

(57) ABSTRACT

A fiber optic cable connector and method provides minimal adhesive wicking and eliminates damage to the cladding or coating on fiber optic cables or other damage caused by adhesive wicking. The fiber optic cable connector has a ferrule and a strain relief boot or an overmold flexible material. A flexible adhesive is applied to a cable side of the strain relief boot to cover the fiber optic cables and fill any voids between the strain relief boot and the fiber optic cables. A rigid adhesive is applied to a terminal side of the strain relief boot to fill any remaining voids. The strain relief boot has the same number of openings as the number of fiber optic cables being used to eliminate adhesive wicking. The ferrule can also have the same number of openings as the number of fiber optic cables being used to eliminate adhesive wicking.

20 Claims, 6 Drawing Sheets

FIBER OPTIC CABLE CONNECTOR

BACKGROUND OF THE INVENTION

The present invention relates to a fiber optic cable system. More specifically, the present invention relates to a fiber optic cable system that avoids potential damage to the cladding and/or coating of a fiber optic ribbon by controlling the placement of adhesives and epoxies.

Fiber optic systems generally accommodate the transmission of optical signals from a light-emitting diode (LED) laser or some other light source to a receiver, such as a photodiode, wavelength-division multiplexing (WDM) component, and the like. When transmitted, optical signals travel through optical cables. These cables are generally constructed of a glass or plastic material and generally have three parts; the core, the cladding and the coating. The core is the center portion of the cable having a higher index of refraction for light transmission. The cladding material is positioned between the core and the coating. The cladding has a lower index of refraction than the core to provide complete internal reflection and encourage light transmission through the core. Without the cladding, light gradually leaks out of the core. As a further protection measure, the coating covers the cladding. The coating is generally a soft, flexible material that protects the fiber from damage.

Fiber optic systems are typically made up of numerous optical components, all communicating via fiber optic cables. As anticipated, the use of quality connections makes these systems operate efficiently. Thus, connectors of many different types are very important to achieve efficient and effective system performance. For example, long distance fiber optic systems may require signal regenerators, signal repeaters, or optical amplifiers in order to maintain signal quality.

In such systems, the quality of the light signal can also be decreased when the cladding and coating materials that protect the core of a fiber optic cable are damaged. While many potential sources for damage exist, one known source is the initial placement of the connector on the fiber optic cable. Additionally, damage may often occur during the mating, unmating and remating of the connectors. In other circumstances, optical systems are subject to high motion environments (i.e., high shock and/or vibration), which creates additional stress on the connectors or cables, and another potential source for damage.

There are several different types of connectors used for fiber-to-fiber connections, including FC, fiber distributed data interface (FDDI), LC, MT Array, subscription channel (SC), SC Duplex and straight tip (ST) connectors. These different types of connectors are used in varying applications based upon their unique performance and overall characteristics. Most fiber-to-fiber connectors have the same four, basic components, however, including a ferrule, a connector body, a cable and a coupling device. The ferrule is a fiber alignment mechanism with a bore generally at the center having a diameter slightly larger than the fiber cladding. The connector body generally holds the ferrule such that the ferrule extends beyond the length of the connector body to slip into a coupling device. The connector body is typically attached to strengthening members or cable jackets via crimping or bonding. Connector bodies are generally alignment sleeves know as feed-through, bulk head adapters. In most instances, a strain relief boot is added at the cable and connector interface to provide extra protection at this junction. The coupling device is attached the exposed portion of the ferrule extending away from the connector body.

In order to achieve an efficient and effective connection, certain steps must be followed when attaching the fiber optic connector to the fiber optic cable. As is understood, the quality of the light signal passing through the connection can be negatively impacted by defects at the end of the fiber cable, dirt or other impurities coating the fiber cable, or deformities in the cladding and coating. Some connector manufacturers provide connector kits to help eliminate or minimize these problems associated with attaching the fiber optic connector to the fiber optic cable.

In the attachment of the fiber optic cables to their related ferrule, various epoxies are traditionally used. These epoxies have strong bonding characteristics but are very rigid once they are cured. Obvious problems are created when these types of rigid epoxies are applied to portions of the connector where flexibility is desired and often necessary. More specifically, these problems include separation of the cladding from the core and damage to the outer coating of the fiber optic cable. In addition to these problems, epoxy making unwanted rigid connections between the cable and the strain relief boot are also undesirable because flexibility would be greatly reduced.

When epoxy is applied between the fiber optic cable and the ferrule, it will often seep or wick into any open voids or holes. As the opening in the ferrule does not precisely match the shape of the fiber optic cable, the potential for seepage always exists. Again, wicking or seepage to undesired locations creates a potential for future cable damage.

Despite efforts by connector manufacturers to standardize and simplify fiber optic connectors, there still exists a need for improved protection of fiber optic connectors. In addition, there exists a need for sealing mechanisms that protect the components of the connector from excessive adhesive wicking without negatively impacting the quality of the optical signal. There also exists a need for a fiber optic cable connector that allows for the termination of more than one fiber optic cable in one connector where the connector is sized to receive a plurality of fiber optic cables, often more than actually used. Having the ability to attach such connectors greatly expands the system capabilities and provides flexibility for the designer. Overall, there is a need to have connectors where the components of the connector are securely adhered to each other without degrading the coating and cladding of the cables or the optic signal.

BRIEF SUMMARY OF THE INVENTION

The present invention relates to a fiber optic cable system that includes minimized adhesive wicking and eliminates problems associated with damage to the cladding and/or coating of a fiber optic ribbon. Other potential damage caused by stress at the junction between the fiber cable and the ferrule is also reduced by the connector configuration of the present invention.

More specifically, the present invention relates to a fiber optic cable connector accommodating at least two fiber optic cables. The fiber optic connector has a ferrule and strain relief boot that are adhered to the fiber optic cables first with a flexible adhesive and then with a rigid adhesive. The ferrule has a ferrule body and at least two fiber optic cable accommodating openings. The fiber optic cable openings of the ferrule are configured to closely receive the fiber optic cables and hold them in predetermined positions. The strain relief boot is positioned between a cable side of the ferrule and the fiber optic cables and has at least two fiber optic cable openings for accommodating the fiber optic cables. The middle section of the strain relief boot is plugged such that there are only enough fiber optic openings for specific number of fiber optic cables being used in the system.

A flexible adhesive is applied to a cable side of the strain relief boot such that it surrounds the fiber optic cables and fills any voids existing between the fiber optic cable and the strain relief boot so a later applied, rigid adhesive does not wick up the fiber optic cables. The rigid adhesive is then applied to an adhesive application opening between a cable side and a terminal side of the ferrule such that it fills any remaining voids existing between the strain relief boot and the fiber optic cable while securely attaching the strain relief boot, the ferrule and the fiber optic cable to one another.

The present invention also relates to a method for creating a fiber optic cable connector. At least two fiber optic cables are inserted into a number of fiber optic cable openings in a strain relief boot. The fiber optic cables are also inserted into a number of fiber optic cable accommodating openings in a ferrule. The strain relief boot is slid toward and under the cable side of the ferrule such that the ferrule substantially covers the strain relief boot. In order to secure the ferrule to the strain relief boot, an upper securing area on the strain relief boot is fitted under a top portion of the cable side of the ferrule. A lower securing area on the strain relief boot is also fitted under a lower portion of the cable side of the ferrule.

A flexible adhesive is applied to the adhesive application opening between the cable side and the terminal side of the ferrule such that the flexible adhesive fills any voids between the strain relief boot and the fiber optic cable. A rigid adhesive is applied to the adhesive application opening between the cable side and the terminal side of the ferrule such that the rigid adhesive flows into any remaining voids.

Alternately, the present invention relates to a fiber optic cable connector accommodating at least two fiber optic cables, wherein the fiber optic connector has an overmold flexible material overmolded on the fiber optic cable(s). The ferrule and the overmold flexible material are adhered to the fiber optic cables with a rigid adhesive. The ferrule has a ferrule body and at least two fiber optic cable accommodating openings. The fiber optic cable openings of the ferrule are configured to closely receive the fiber optic cables and hold them in predetermined positions. The overmold flexible material is positioned between a cable side of the ferrule and the fiber optic cables and has at least two cable receiving openings for accommodating the fiber optic cables.

A rigid adhesive is then applied to an adhesive application opening between a cable side and a terminal side of the ferrule such that it fills any remaining voids existing between the overmold flexible material and the fiber optic cable while securely attaching the overmold flexible material, the ferrule and the fiber optic cable to one another.

In light of the above issues related to fiber optic cable systems, it is the object of the present invention to provide a fiber optic system having improved strain relief. It is also an object of the present invention to provide a fiber optic cable systems having increased flexibility with reduced damage to the cladding and coating of the fiber optic cable. It is yet another object of the present invention to provide a fiber optic cable system that accommodates connecting a plurality of fiber optic cables in one connector where the connector is sized to receive a plurality of fiber optic cables. It is yet another objective of the present invention to provide controlled placement of both a flexible adhesive and a rigid adhesive to securely attach the fiber optic cable to the strain relief boot and the ferrule.

DETAILED DESCRIPTION OF THE INVENTION

Figure 1:
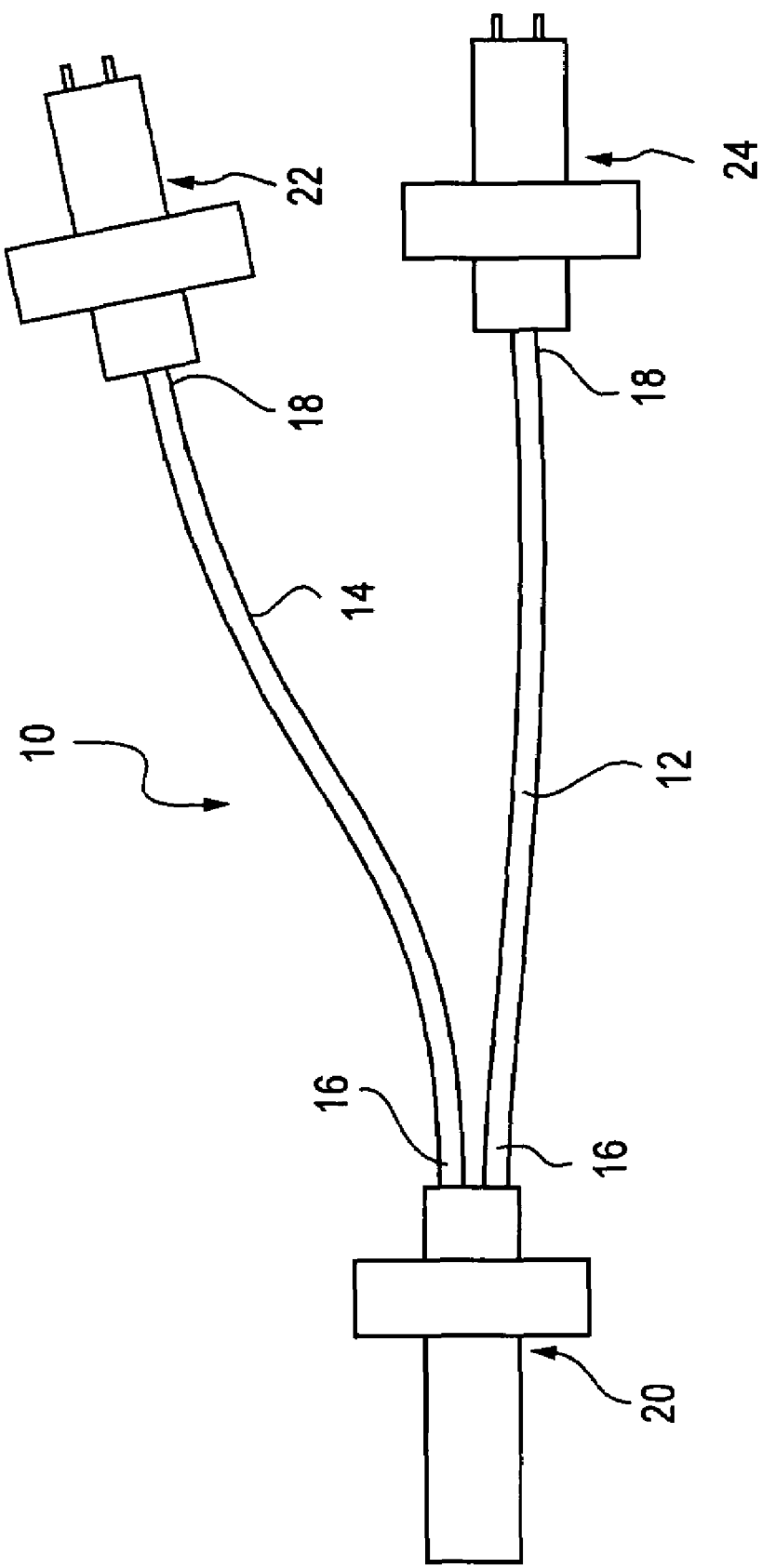
FIG. 1 is a top view of a fiber optic cable system.

Referring now to FIG. 1 there is shown a fiber optic cable system 10 having a first fiber optic cable 12 and a second fiber optic cable 14. The fiber optic cables 12 and 14 are terminated on a first end 16 to a first fiber optic connector 20. The cables 12 and 14 are terminated on a second end 18 to a second fiber optic connector 22 and a third fiber optic connector 24. In one embodiment, the first fiber optic connector 20 is a 12-fiber connector. The second and third fiber optic connectors 22 and 24 have fewer than 12 fibers. For example, 4-fiber connectors may be used. As can be anticipated, the actual number of fiber optical cables 12 and 14 accommodated per connector 20, 22, 24 and the number of connectors 20, 22, 24 may increase or decrease drastically, depending on the particular application.

Figure 2:
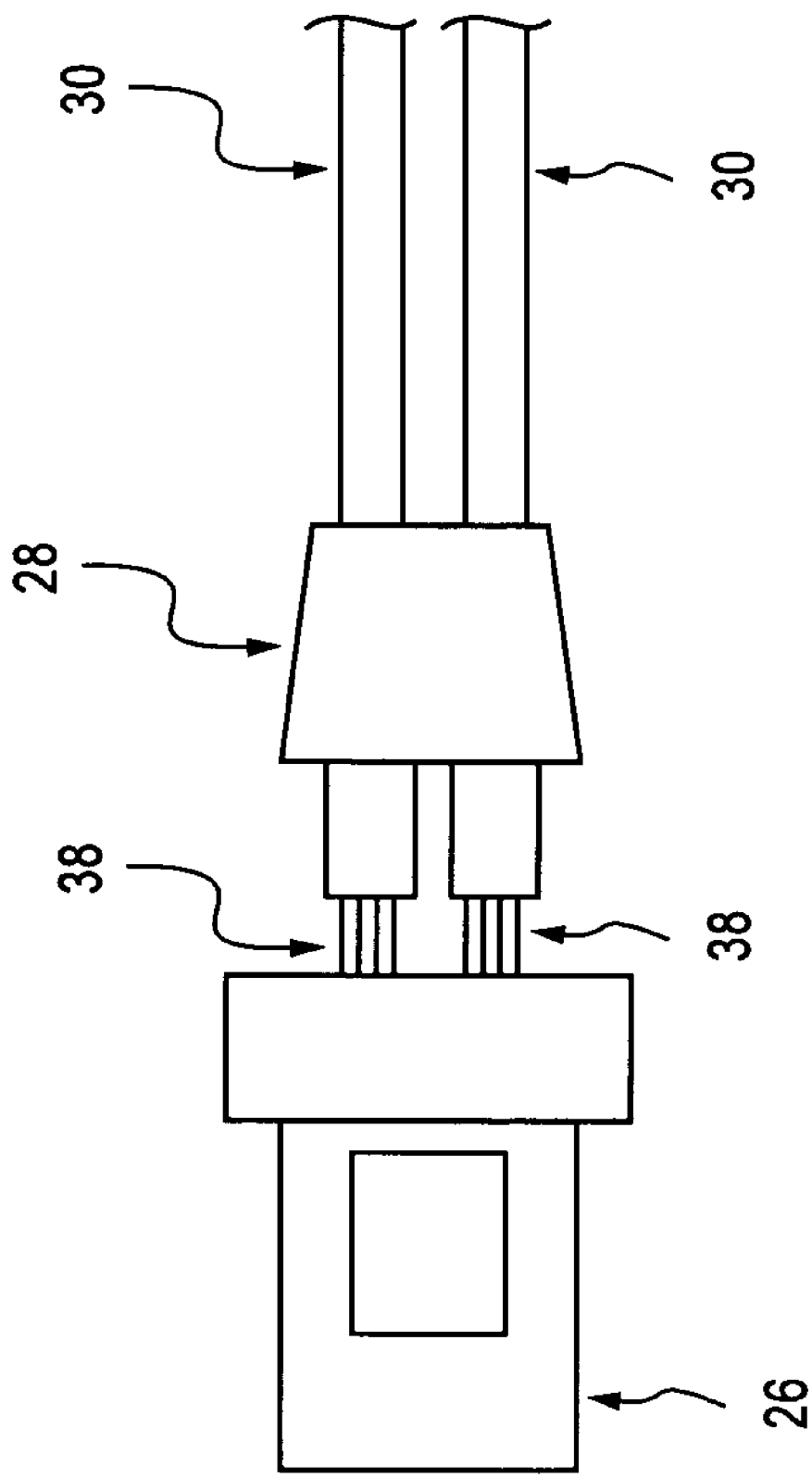
FIG. 2 is a top view of a ferrule and a strain relief boot with two fiber optic cables inserted therethrough.
Figure 2A:
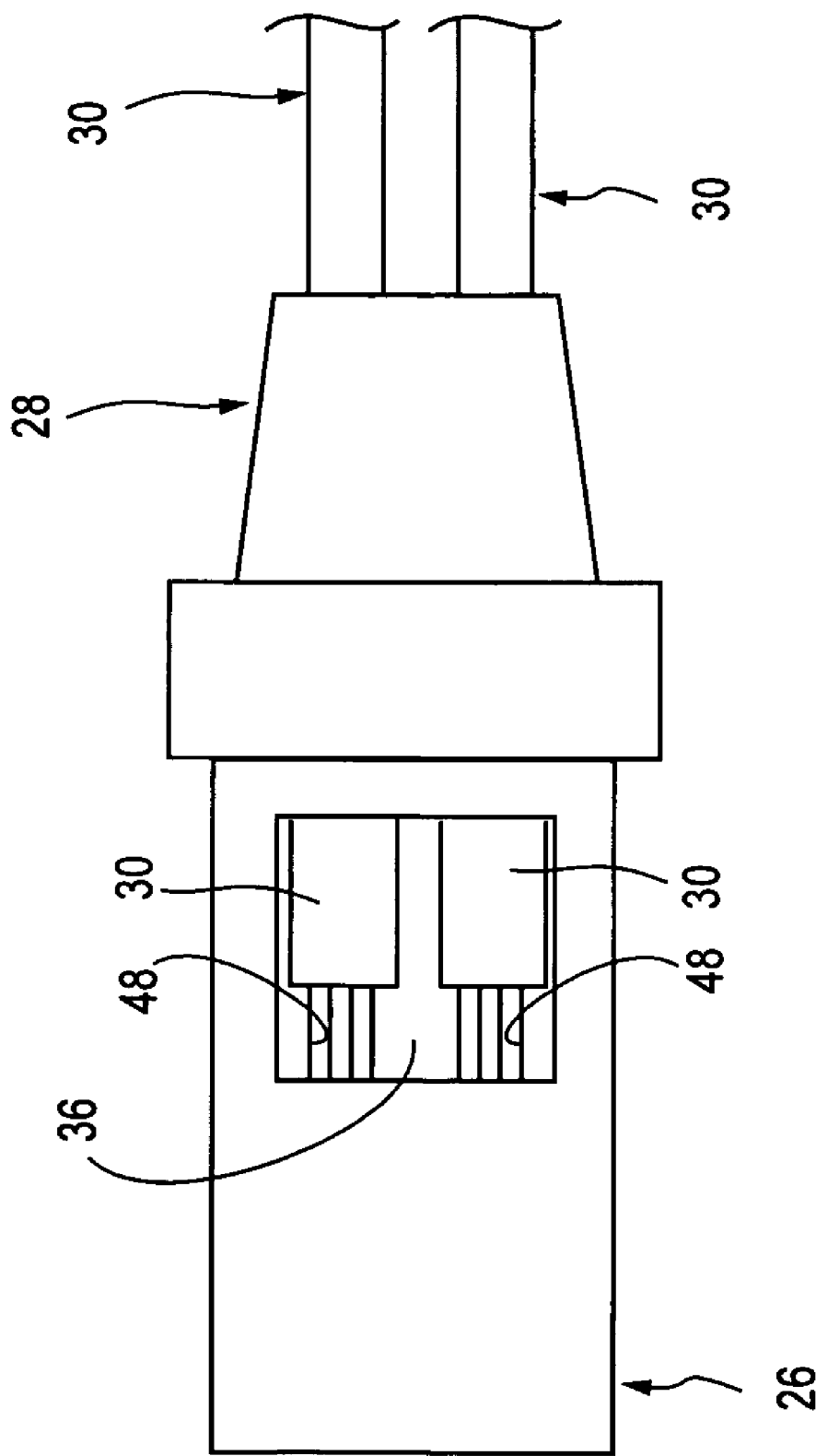
FIG. 2a is a top view of a ferrule and a strain relief boot with two fiber optic cables inserted therethrough.

Referring now to FIG. 2 there is shown a fiber optic cable system having a ferrule 26, a strain relief boot 28, and at least two fiber optic cables 30. The fiber optic cables 30 are fed through the strain relief boot 28 and terminate in the ferrule 26 as depicted in FIG. 2a.

Figure 3:
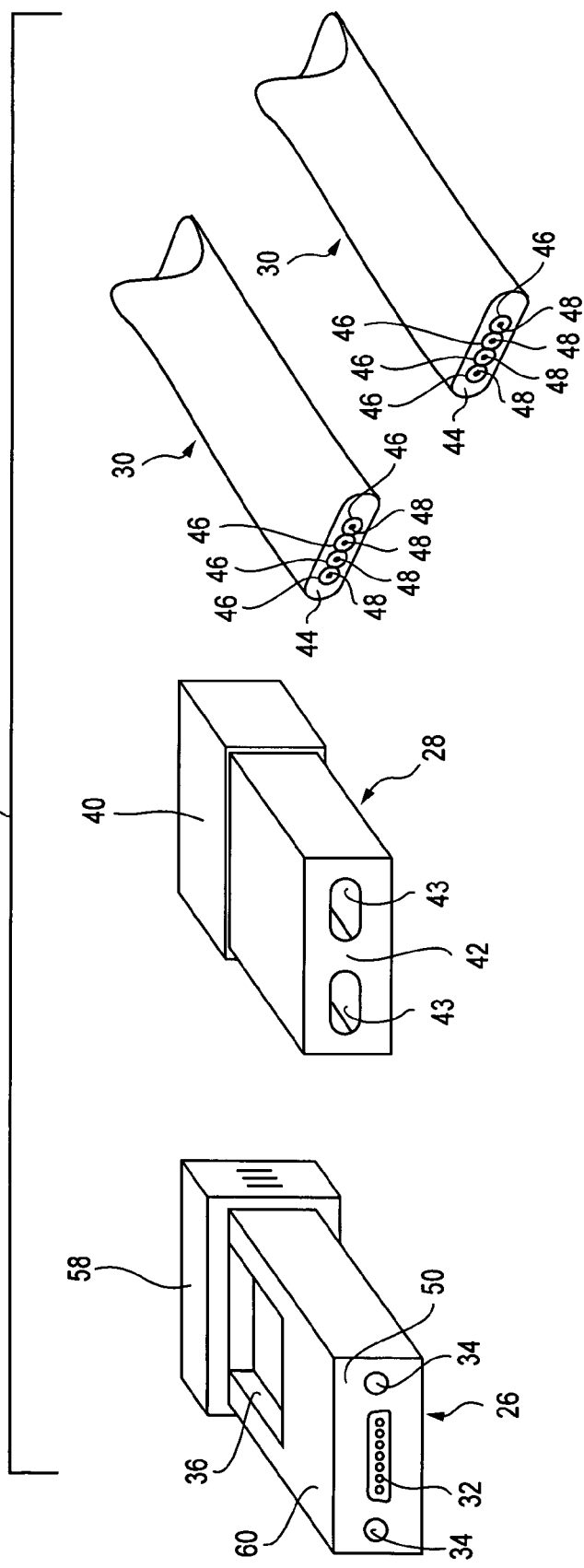
FIG. 3 is an exploded perspective view of a fiber optic connector.

Referring now to FIG. 3, the ferrule 26 of the present invention has a plurality of fiber optic cable accommodating openings 32, connecting pin holes 34, and an adhesive application opening 36 between a cable side 58 and a terminal side 60. In one embodiment of the present invention, the ferrule 26 may be formed such that a middle portion of a single fiber optic cable accommodating opening 32 is eliminated because of the need to accommodate fewer fiber optic cables 30. Fiber optic cable accommodating openings 32 on the two exterior sides remain open with at least one eliminated or plugged fiber optic cable accommodating openings 32 between the open fiber optic cable accommodating openings 32. In this manner the ferrule 26 may accommodate more than one fiber optic cable 30. However, the ferrule 26 of the present invention only has the necessary number of fiber optic cable accommodating openings 32 to accommodate the number of fiber optic cables 30 being used—in this case two. In one embodiment of the present invention, the fiber optic cable accommodating openings 32 are individual openings shaped to receive an individual fiber optic cable 30. In another embodiment of the present invention, the fiber optic cable accommodating opening 32 are configured to simultaneously receive a plurality of fiber optic cables 30. For example, the fiber optic cable accommodating openings 32 can be substantially rectangular shaped such that a plurality of non-stripped fiber optic cables 30 can be inserted into and through the ferrule 26.

The strain relief boot 28 of the present invention has a rigid a flexible covering material 40 and at least one solid intermediate section 42. At least two fiber optic cables 30 are inserted into the end consisting of the flexible covering material 40. The cables 30 fit snuggly within at least one fiber optic cable openings 43. In one embodiment of the present invention, the fiber optic cable openings 43 are individual openings shaped to receive an individual fiber optic cable 30. In another embodiment of the present invention, the fiber optic cable openings 43 are configured to simultaneously receive a plurality of fiber optic cables 30 such that the cables 30 can be inserted into the fiber optic cable openings 43 without stripping the coating 44 or a cladding 46. In one embodiment of the present invention, the strain relief boot 28 has only one solid intermediate section 42 vertically positioned between two fiber optic cable openings 43. The solid intermediate section 42 extends longitudinally through the center of the strain relief boot 28 extending from the face adjacent the ferrule 26 to the flexible covering material 40. In another embodiment of the present invention, the strain relief boot 28 has a plurality of solid intermediate sections 42 vertically positioned between three or more individual fiber optic cable openings 43 and extending longitudinally along the length of the strain relief boot 28. In this manner, the strain relief boot 28 has only the number of individual fiber optic cable openings 43 necessary to accommodate the number of fiber optic cables 30 being used in the fiber optic cable system 10.

The fiber optic cables 30 used in the present invention are well known by those familiar with the art. The cables 30 have at least one core 48. The core 48 is enclosed in a cladding 46 consisting of a relatively flexible, light impervious material designed to urge light transmission in the core 48 of the cable 30. The cladding 46 is enclosed in a coating 44 consisting of a material less flexible than the cladding 46 and designed to protect the core 48 and the cladding 46 from damage.

Figure 4:
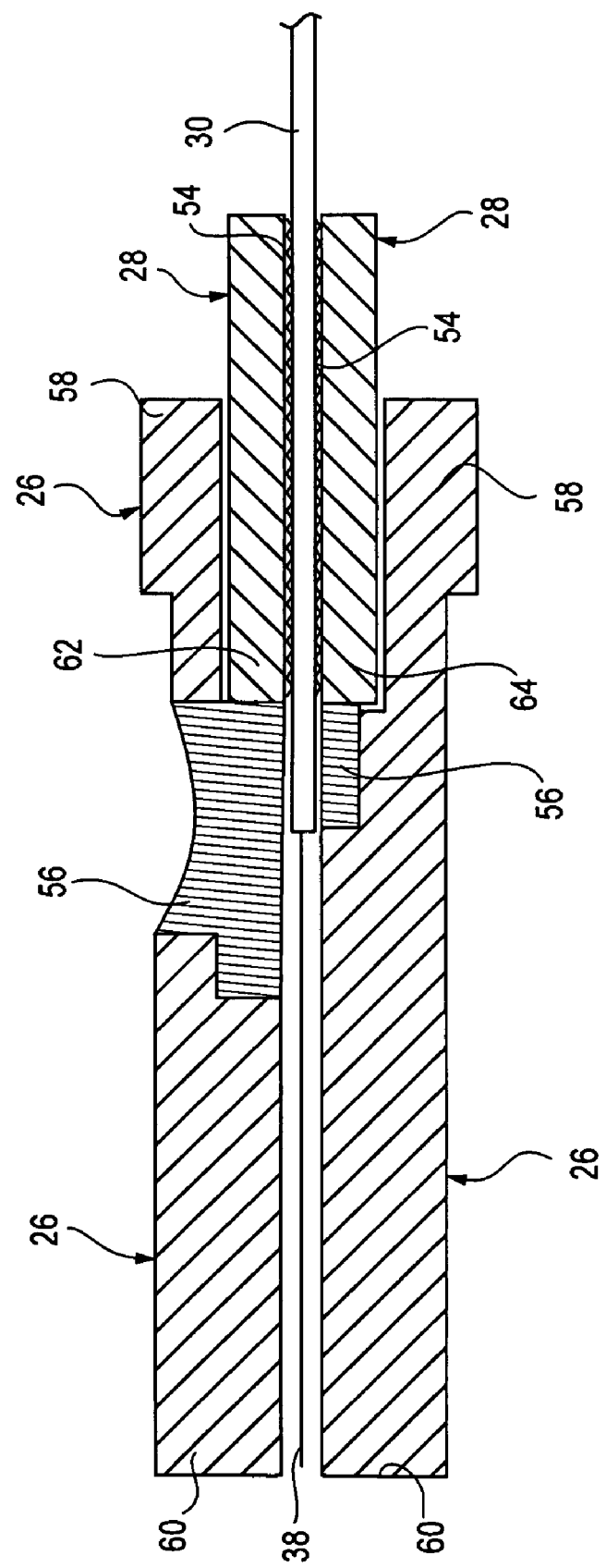
FIG. 4 is a cross section view of a fiber optic connector with a strain relief boot.

Now that each component of the present invention has been discussed, following is a discussion of the assembly and operation of the fiber optic cable system 10 of the present invention. Referring to FIG. 4, in one embodiment of the present invention, the coating 44 of a specified length of fiber optic cables 30 is stripped off of the cladding 46 at an end being terminated at a fiber optic cable connector 20, 22, 24 (see FIG. 1). The stripped segment of the fiber optic cable 30 is inserted into and through the strain relief boot 28. The strain relief boot 28 has the precise number of fiber optic cable openings 43 such that there are no empty fiber optic cable openings 43 after the cables 30 are inserted into the strain relief boot 28. In this manner, there are fewer voids in the fiber optic cable connector.

The fiber optic cables 30 are then inserted into the fiber optic cable accommodating holes 32 of the ferrule 26. The cables 30 are fed through the ferrule 26. In one embodiment, the cables 30 are fed completely through the ferrule 26 to be trimmed and polished.

The strain relief boot 28 is then slid along the fiber optic cable 30 toward the cable side 58 of the ferrule 26. An upper securing area 62 is fitted under the top of the cable side 58 of the ferrule 26. A lower securing area 64 is fitted under the bottom of the cable side 58 of the ferrule 26. In this manner, the strain relief boot 28 is substantially covered by the cable side 58 of the ferrule 26.

A flexible adhesive 54 is applied to the cable side 58 of the strain relief boot 28. The flexible adhesive 54 is applied to provide a seal such that a rigid adhesive 56 applied after the flexile adhesive 54 does not wick up the cables 30 or into any voids between the strain relief boot 28 and the cable 30 and cause cracks or deformities therein. In addition, the flexible adhesive 54 provides extra support and protection for the coating 44 and cladding 46 of the fiber optic cables 30. The flexible adhesive 54 may be any adhesive with a lower viscosity than the rigid adhesive 56. Suitable adhesives include room temperature vulcanizing polymers and ultra violet curable compounds, such as silicone based adhesives.

The rigid adhesive 56 is applied via the adhesive application opening 36 of the strain relief boot such that it flows into any remaining voids to firmly adhere the components of the fiber optic cable connector 20, 22, 24 to one another. The rigid adhesive 56 may be any adhesive with a higher viscosity than that of the flexible adhesive 54. Suitable adhesives include thermally curable epoxy and ultra violet curable epoxy.

Once the adhesives 54, 56 are applied, the terminal ends of the fiber optic cable 30 may need to be cleaned and polished according to techniques well known in the art.

Figure 5:
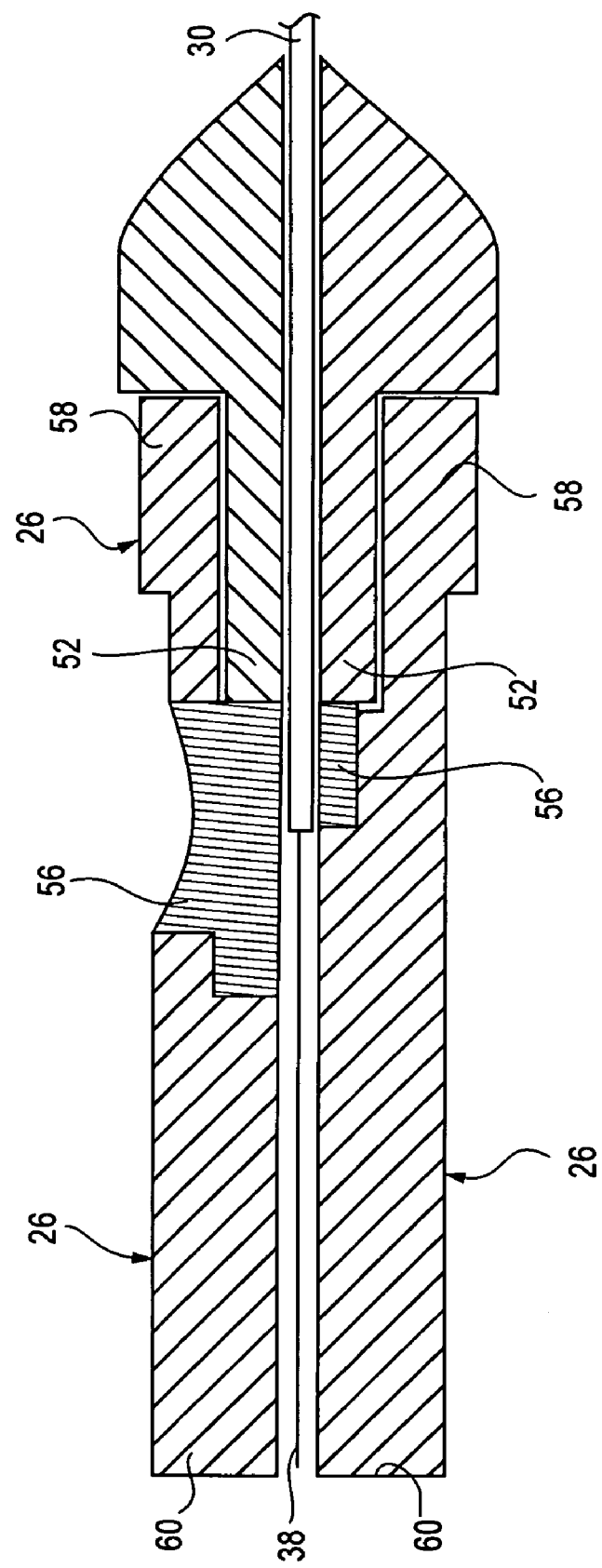
FIG. 5 is a cross section view of a fiber optic connector with an overmold flexible material.

Referring now to FIG. 5, in another embodiment, an overmold flexible material 52 is used rather than the strain relief boot 28 to provide strain relief where the cables 30 are inserted into the ferrule 26. Suitable material for the overmold flexible material 52 include various grades of moldable silicone polymers and fluorosilicone polymers.

Still referring to FIG. 5, the ferrule 26 is molded on the overmold flexible material 52 such that the overmold flexible material will not separate from the ferrule 26. The overmolding process is conducted via techniques widely known in the art. Once the overmold flexible material 52 is overmolded on the ferrule 26, the cable 30 is inserted into at least one cable receiving opening in a cable side 68 of the overmold flexible material 52 and fed into the ferrule 26. In this manner, the overmold flexible material 52 is fitted around the cable. Finally, a rigid adhesive 56 is applied via the adhesive application opening 36 of the strain relief boot such that it flows into any remaining voids to firmly adhere the cable 30, ferrule 26 and overmold flexible material 52 to one another.

The invention has herein been described in its preferred embodiments to provide those skilled in the art with the information needed to apply the novel principles and to construct and use the embodiments. However, it is to be understood that the invention can be carried out by specifically different devices and that various modifications can be accomplished without departing from the scope of the invention itself, which is set out in the following claims:

What is claimed is:

1. A fiber optic cable connector accommodating a plurality of fiber optic cables, comprising:
   a ferrule having a ferrule body and at least two fiber optic cable accommodating openings, wherein the fiber optic cable accommodating openings are configured to closely receive the fiber optic cables, and wherein the fiber optic cable accommodating openings hold the fiber optic cables in predetermined positions;
   a strain relief boot positioned between a cable side of the ferrule and the fiber optic cables, wherein the strain relief boot includes a middle section with at least one fiber optic opening configured to accommodate a portion of the plurality of fiber optic cables;
   a flexible adhesive applied to the cable side of the strain relief boot, wherein the flexible adhesive surrounds the fiber optic cables and fills any voids existing between the fiber optic cable and the strain relief boot including any open spaces within the plurality of fiber optic cable openings; and
   a rigid adhesive applied to a terminal side of the strain relief boot, wherein the rigid adhesive fills any remaining voids existing between the strain relief boot and the fiber optic cables, and wherein the rigid adhesive is applied only after the flexible adhesive is applied such that the rigid adhesive does not wick to the cable side of the strain relief boot and does not occupy any spaces between the cable and the strain relief boot in the area where the flexible adhesive is present.

2. The fiber optic cable connector of claim 1 wherein the ferrule has an adhesive application opening.

3. The fiber optic cable connector of claim 1 wherein the fiber optic cable accommodating openings of the ferrule are configured to receive only two fiber optic cables.

4. The fiber optic cable connector of claim 1 wherein the fiber optic cable openings of the strain relief boot are configured to simultaneously receive a plurality of fiber optic cables.

5. The fiber optic cable connector of claim 1 wherein the fiber optic cable openings of the strain relief boot are configured to receive only two fiber optic cables.

6. The fiber optic cable connector of claim 1 wherein the fiber optic cable openings of the strain relief boot are configured to simultaneously receive a plurality of fiber optic cables.

7. A method of creating a fiber optic cable connector comprising the steps of:
   inserting at least two fiber optic cables into a number of fiber optic cable openings in a strain relief boot;
   inserting the fiber optic cables into a number of fiber optic cable accommodating openings in a ferrule;
   sliding the strain relief boot toward and under a cable side of the ferrule such that the ferrule substantially covers a terminal side of the strain relief boot, wherein an upper securing area on the strain relief boot is fitted under a top portion of the cable side of the ferrule, and wherein a lower securing area on the strain relief boot is fitted under a lower portion of the cable side of the ferrule;
   applying a flexible adhesive to the cable side of the strain relief boot such that the flexible adhesive fills any voids between an inner surface of the strain relief boot openings and the fiber optic cables; and
   applying a rigid adhesive to the terminal side of the strain relief boot such that the rigid adhesive flows into any remaining voids but is prevented from flowing into the areas where flexible adhesive is present.

8. The method of claim 7, wherein the strain relief boot comprises a number of individual fiber optic cable openings necessary to accommodate a number of fiber optic cables.

9. The method of claim 7, further providing application of the flexible adhesive via an adhesive opening window.

10. The method of claim 7, wherein the flexible adhesive is selected from the group consisting of room temperature vulcanizing polymers and ultra violet curable compounds.

11. The method of claim 7, further providing application of the rigid adhesive via an adhesive opening window.

12. The method of claim 7, wherein the rigid adhesive is selected from the group consisting of thermally curable epoxy and ultra violet curable epoxy.

13. A fiber optic cable connector means for connecting a plurality of fiber optic cables to other components in a fiber optic system comprising:
   a first means for securing the fiber optic cables, wherein the first means comprises a body and at least two fiber optic cable accommodating means for securing the fiber optic cables;
   a second means for securing the fiber optic cables while providing flexibility at the point where the first means meets the fiber optic cables, wherein the second means comprises at least two fiber optic cable opening means for accommodating the fiber optic cables;
   a flexible adhesive means applied on a cable side of the second means for surrounding the fiber optic cables and filling any voids existing between the fiber optic cable accommodating means and the fiber optic cables the flexible adhesive means positioned to enclose the two fiber optic cable opening means; and
   a rigid adhesive means applied on a terminal side of the second means for filling any remaining voids existing between the first means and the fiber optic cables the rigid adhesive means unable to flow into areas previously occupied by the flexible adhesive means.

14. The fiber optic connector means of claim 13 wherein the first means has an adhesive application opening.

15. The fiber optic connector means of claim 13 wherein the flexible adhesive means is selected from the group consisting of room temperature vulcanizing polymers and ultra violet curable compounds.

16. The fiber optic connector means of claim 15 wherein the rigid adhesive means is selected from the group consisting of thermally curable epoxy and ultra violet curable epoxy.

17. A fiber optic cable connector accommodating a plurality of fiber optic cables, comprising:
   a ferrule having a ferrule body and at least two fiber optic cable accommodating openings, wherein the fiber optic cable accommodating openings are configured to closely receive the fiber optic cables, and wherein the fiber optic cable accommodating openings hold the fiber optic cables in predetermined positions;
   an overmold flexible material positioned between a cable side of the ferrule and the fiber optic cables, wherein the ferrule overmolded on the flexible overmold material and the fiber optic cables are attached to the ferrule and the overmold flexible material via a rigid adhesive, and wherein the overmold flexible material is selected to avoid wicking of the rigid adhesive to a cable side of the overmold flexible material; and
   a rigid adhesive applied to a terminal side of the overmold flexible material, wherein the rigid adhesive fills any remaining voids existing between the flexible overmold material, the ferrule and the fiber optic cables.

18. The fiber optic cable connector of claim 17 wherein the ferrule has an adhesive application opening.

19. The fiber optic cable connector of claim 17, wherein the overmold flexible material is selected from the group consisting of silicone polymers and fluorosilicone polymers.

20. A method of creating a fiber optic cable connector comprising the steps of:
   inserting at least two fiber optic cables into a number of fiber optic cable openings in a cable side of an overmold flexible material wherein the overmold flexible material is closely fitting with the inserted fiber optic cables;
   inserting the fiber optic cables into a number of fiber optic cable accommodating openings in a ferrule; and
   applying a rigid adhesive to a cable side of the ferrule via an adhesive application opening in the ferrule, and wherein the rigid adhesive flows into any remaining voids but is prevented from flowing into the opening in the overmold flexible material due to the close fitting between the inserted fiber optic cables and the overmold flexible material.

* * * * *